Figure 1:
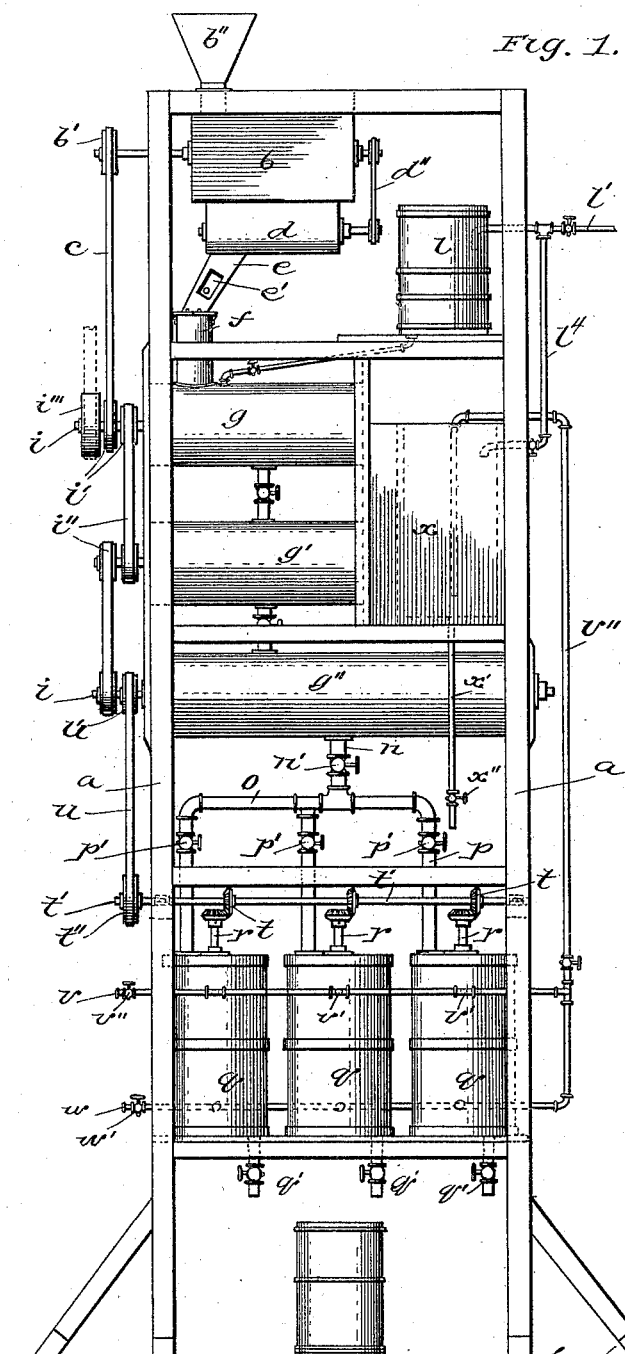

(No Model.)

2 Sheets—Sheet 1.

F. H. SHEPHERD.
PASTE MAKING MACHINE.

No. 476,320. Patented June 7, 1892.

Witnesses
Wm R Davis
E. J. Cussen

Inventor
F. H. Shepherd
By Alexander F. Davis
his Attorneys

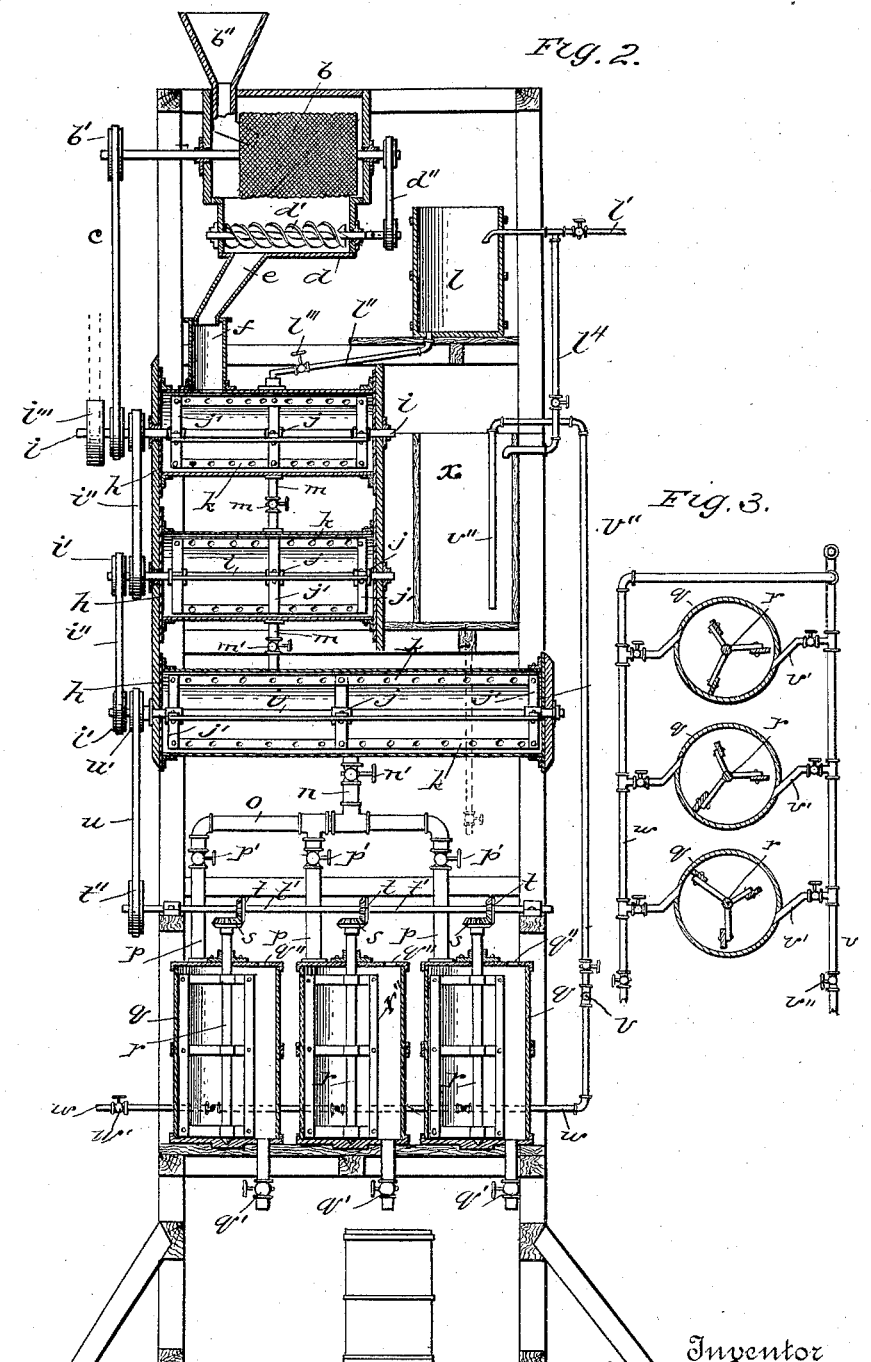

UNITED STATES PATENT OFFICE.

FRANCIS H. SHEPHERD, OF DAVENPORT, IOWA, ASSIGNOR TO JOSEPH S. FARIS, OF SAME PLACE.

PASTE-MAKING MACHINE.

SPECIFICATION forming part of Letters Patent No. 476,320, dated June 7, 1892.

Application filed November 7, 1891. Serial No. 411,394. (No model.)

*To all whom it may concern:*

Be it known that I, FRANCIS H. SHEPHERD, a citizen of the United States, residing at Davenport, in the county of Scott and State of Iowa, have invented certain new and useful Improvements in Paste-Making Machines, of which the following is a specification, reference being had therein to the accompanying drawings.

This invention relates to that class of machines designed for making wet or liquid paste, wherein are employed means for preliminarily sifting the flour, then mixing the same with water, and finally cooking the mixed paste, the whole being a continuous process and the paste being discharged ready for use; and it consists in the novel combination and arrangement of parts, as will be more fully hereinafter described, and particularly pointed out in the claim appended.

The object of the invention is to provide a machine of simple construction by means of which the raw materials are taken and mixed into a paste and the paste cooked as long as desired, and means for stirring the paste while it is being cooked and for discharging the cooked paste into suitable receptacles, all of which will be more fully hereinafter set forth.

In the drawings, Figure 1 is a side elevation of my improved machine. Fig. 2 is a longitudinal vertical sectional view of the same. Fig. 3 is a horizontal sectional view of the cooking-receptacles, the supporting-frame being removed.

In the construction shown I employ a suitable frame-work $a$, in which to mount the operating mechanism. In the upper part of this frame-work I secure the revolving sieve or reel $b$. This reel is driven by a belt $c$, which extends from a pulley on the driving-shaft over a pulley $b'$, secured on the outer end of the reel-shaft. Flour is introduced into the reel by feeding it into the hopper $b''$ by any suitable means. To the under side of the casing containing the revolving sieve is secured the trough $d$, which receives the sifted flour. A conveyer $d'$, mounted in this trough and driven by a belt $d''$ from the sieve-shaft, carries the flour forward in the trough and discharges it through the inclined spout $e$ into the hopper $f$, which is secured on the upper side near the outer end of the mixer $g$. The trough $e$ is provided with the sliding door $e'$, (which may be provided with a glass panel,) by means of which the flow of flour may be watched and any choking of the spout caused by the stoppage of the flow of flour therein may be easily remedied. The hopper $f$ is provided with a hinged cover, so that it may be readily opened and cleaned when desired.

In the construction of my machine shown I employ three mixing-receptacles $g$, $g'$, and $g''$, the receptacle $g''$ (the lowermost one) being somewhat longer than $g$ and $g'$, it extending the full width of the framing of the machine. Each of these receptacles is constructed of a cylindrical body of sheet metal provided at its ends with the closed head $h$. Each of said receptacles is provided with a central horizontal shaft $i$, which shafts are journaled in bearings in the heads $h$ and extend out through the same, their outer ends being provided with pulleys $i'$ and these pulleys being connected by driving-belts $i''$. The shaft $i$ in the receptacle $g$ is also provided on its outer end with the main driving-pulley $i'''$. Secured on these shafts $i$ within the receptacles are the hubs $j$, which are provided with the radial arms $j'$, (of which there are preferably four,) and the outer ends of these arms are connected by the perforated slats or bars $k$, which operate to mix the batter of water and flour when the shafts are revolved by means of the pulleys and belts described. The object of the perforations in the bars $k$ is to allow the batter to pass through them, thereby breaking up the lumps and lessening the pressure of the batter against the bars as they revolve. In the framing $a$, high enough above the mixer $g$ to secure the required water-pressure to force the water through the receptacles, I secure a water tank or receptacle $l$, which is provided with a supply-pipe $l'$ and an outlet-pipe $l''$. The pipe $l''$ enters the mixer $g$ on its upper side near the lower end of the hopper $f$, so that the inflowing water will readily mix with the inflowing flour, and it is provided with a valve $l'''$ for regulating the flow of water into the mixer.

The mixing-receptacle $g$ is provided on its under side, about midway its ends, with the large pipe $m$ for the passage of the batter from mixer $g$ to mixer $g'$, and said pipe is provided with the valve $m'$ for regulating the flow of batter and enters the upper side of mixing-receptacle $g'$. The receptacle $g'$ is provided on its under side with a similar valved pipe for the passage of batter from it to the mixing-receptacle $g''$.

The mixing-receptacle $g''$ is provided on its under side with a pipe $n$, whose lower end connects with a horizontal pipe $o$, by means of which and the vertical pipes $p$, connected to said pipe $o$, (the lower ends of pipes $p$ entering the cookers $q$ through their covers,) the batter is fed from the mixers to the cookers $q$.

The pipe $n$ is provided with the valve $n'$, by means of which the flow of batter from the mixer $g''$ may be regulated or shut off entirely, and pipes $p$ are provided with valves $p'$, by means of which the flow of batter to each of the cookers $q$ may be regulated and cut off entirely when desired. As shown in the drawings, I employ three of these cookers $q$, which are constructed of upright cylinders closed at their upper and lower ends and provided at their lower ends with a valved discharge-pipe $q'$ and the openings $q''$ in their covers to permit of the introduction of the preserving-chemical. I prefer to use three cookers, as described; but it is evident one or more may be used, as described.

Central vertical shafts $r$ are mounted in each of the cooking-receptacles, and on each of the shafts within the receptacles are secured the radial arms $r'$, to the outer ends of which are secured the perforated vertical slats or bars $r''$. These radial arms $r'$ are of unequal lengths and are so arranged that the entire contents of each of the cookers are agitated when its shaft is revolved, they being so located that the bar secured to the longest radial arms will scrape the inner side of the cooker and the lower set of radial arms the bottom of the cooking-receptacle, as is evident. It will thus be seen that the entire contents of the cookers will be constantly agitated and the preserving-chemical thoroughly mixed with them while they are being cooked.

The upper ends of the shafts $r$ extend through the covers of the cookers through suitable boxes or bearings and are provided with beveled cog-wheels $s$, which mesh with similar wheels $t$, secured on a horizontal shaft $t'$, which is mounted in bearings secured to the frame $a$. The outer end of this shaft is provided with a pulley $t''$, by means of which and the belt $u$ and the pulley $u'$ on the shaft of mixing-receptacle $g''$ the shaft $t'$ is revolved. The pulley $t''$ may be placed in the middle of the shaft $t'$, if desired.

A steam-supply pipe $v$ is arranged across the upper ends of the cooking-receptacles and is provided with branch pipes $v'$, which enter said receptacles at an oblique angle inclined in the direction of the travel of the shafts in the cookers and supply steam to their upper ends, and a steam-pipe $w$ is arranged across the lower ends of the cooking-receptacles at the opposite side of same from pipe $v$ and are also provided with branch pipes which enter the receptacles at an oblique angle and are also inclined in the direction of the travel of the shafts in the cookers and supply steam to their lower ends. The object of having these branch pipes enter the cookers at angles inclined in the direction of the travel of the shafts in the cookers is that the steam flowing through them into the cookers will aid in imparting a rotary motion to the mixture contained therein. The pipes $v$ and $w$ are provided with valves $v'$ and $w'$ for regulating the supply of steam to the cooking-receptacles. It will thus be seen that steam in any desired quantity may be supplied to the cooking-receptacles. The advantage of supplying the steam to the upper and lower ends of the cooking-receptacles is evident, as by that arrangement the entire contents of the receptacles are thoroughly cooked.

A pipe $v''$ conveys steam from pipe $v$ to the chemical-tank $x$, located in the upper part of the main frame for warming the chemical previous to introducing it into the batter. The chemical is drawn from the tank $x$ by means of the pipe $x'$, extending from the bottom of the tank and provided with a valve $x''$.

A pipe $l^4$, extending from the pipe $l$, supplies water to the chemical-tank for diluting the preserving-chemical, if it is desired.

The machine thus constructed has a number of important advantages. It is very compact and simple and the valved connections are so arranged that the flow of the paste materials through the machine may be regulated easily. The series of horizontal mixers connected by valved pipes is advantageous in that it insures a more thorough pulverization and mixture of the materials, and the series of vertical cooking-cylinders provided with vertical mixers and located directly under and connected by pipes to the lowest mixer and provided with discharge-pipes, these pipes being provided with independent valves to regulate the supply of paste to and the discharge from the cylinders, is important, in that it insures the thorough mixture and cooking of every particle of the materials, and also enables the operator to regulate the flow of paste to and from the cylinders in order that he may cook the paste in one cylinder to a greater degree than that in the others, and thereby produce different varieties of pastes with the one machine and by a continuous process. The valved steam-pipes entering the cylinders on its opposite sides and at an angle are also advantageous in that the cooking in the different cylinders may be varied at will, according to the kinds of paste desired, and the rotation of the paste within the cylinders and its thorough mixture and cooking effected.

Having thus fully described my invention, what I claim, and desire to secure by Letters Patent, is—

In a paste-making machine, the combination of a frame, a rotary sieve mounted in the upper part thereof and provided with means for supplying flour to it, a series of horizontal cylindrical mixers mounted one above the other and means for delivering the flour from the sieve to the uppermost mixer, means for supplying a liquid to the uppermost mixer, horizontal rotary stirrers within the mixers and having their shafts extending out through the heads thereof and provided with pulleys, valved pipes connecting the mixers, a series of independent vertical cooking-cylinders mounted in the frame below the lowest mixer, vertical stirrers journaled in these cooking-cylinders and having their shafts extending out through the covers thereof, a horizontal shaft connected to the stirrer-shafts and provided with a pulley on its end, a series of belts connecting the pulleys on the several shafts, valved paste-pipes $p$, leading into the cookers and connected together above their valves and to the lowest mixer, valved discharge-pipes $q'$, connected to the cooking-cylinders, and valved steam-pipes connecting the cookers, substantially as described.

In testimony whereof I affix my signature in presence of two witnesses.

FRANCIS H. SHEPHERD.

Witnesses:
 E. E. FASHION,
 FRED W. WARREN.